United States Patent Office 3,192,100
Patented June 29, 1965

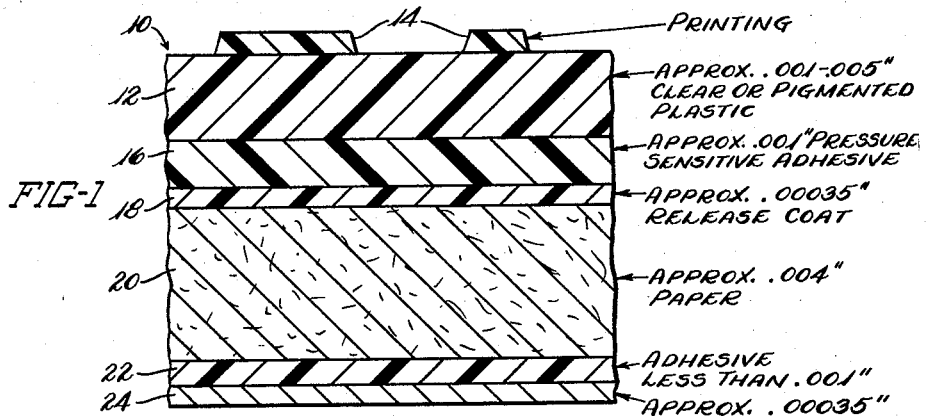
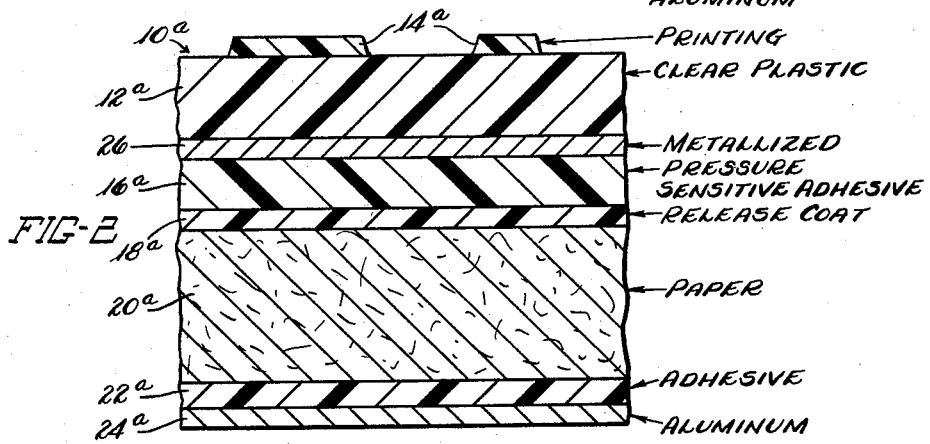
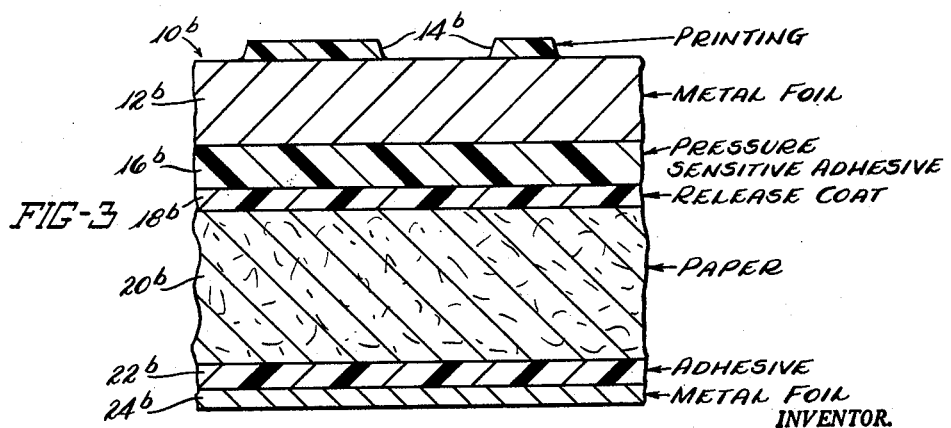

3,192,100
FLEXIBLE CURL-FREE LAMINATE WITH PRESSURE SENSITIVE ADHESIVE BACKING
Burton D. Morgan, Hudson, Ohio, assignor to Morgan Adhesives Company, Stow, Ohio, a corporation of Ohio
Filed Nov. 1, 1960, Ser. No. 66,486
3 Claims. (Cl. 161—165)

This invention relates to flexible laminates including a layer of pressure sensitive adhesive with a paper backing therefor, and, more particularly, is concerned with laminates of the indicated type specifically adapted to have silk screen printing applied to the surface sheet thereon.

Flexible laminates having a surface sheet adapted for silk screen printing and a pressure sensitive adhesive backing covered and protected with a layer of paper which is stripped off to expose the pressure sensitive adhesive have been subject to expansion, contraction, and curling of the paper backing in particular so that silk screen or other printing on the surface sheet is rendered more difficult or is not of a uniformly high grade quality. This difficulty has been due, it is believed, to absorption of moisture into the paper layer of the laminate.

Additionally, in laminates of the type described there is often a springiness or a tendency to warp, wave, or wrinkle so that the laminate does not lie dead flat during the printing operation.

It is the general object of the invention to avoid and overcome the foregoing and other difficulties of and objections to prior art practices by the provision of an improved, relatively inexpensive, uniformly high grade, flexible laminate having a pressure sensitive adhesive backing covered with a removable paper, the laminate being particularly adapted to silk screen printing operations, the laminate being characterized by being substantially curl-free and having a built-in deadening effect causing it to lie particularly flat during printing operations thereon.

Another object of the invention is the provision of a laminate of the type described wherein the paper backing for the pressure sensitive adhesive is covered with a thin layer of aluminum foil so as to prevent the passage of moisture to the paper, and with the foil providing a deadening effect on the laminate so that it lies particularly flat during a printing operation upon the surface sheet of the laminate.

The foregoing objects of the invention, and other objects which will become apparent as the description proceeds, are achieved by the provision of a substantially curl-free laminate for use as an adhesive-backed, silk-screening material and comprising a flexible surface sheet compatible to receiving silk-screen printing on its exposed surface, a layer of pressure sensitive adhesive applied to the underside of the surface sheet, a layer of release material incompatible with the adhesive layer applied to the underside of the adhesive layer, a layer of paper applied to the underside of the release material, a layer of adhesive applied to the underside of the paper, and a layer of metal having a thickness of less than about .0005" applied to the underside of the last-named layer of adhesive.

For a better understanding of the invention reference should be had to the accompanying drawings wherein FIG. 1 is an enlarged fragmentary cross-sectional view through a laminate incorporating the principles of the invention;

FIG. 2 is a view similar to FIG. 1 except that FIG. 2 illustrates a laminate having a clear plastic surface sheet utilizing a metallized backing; and FIG. 3 is a view similar to FIGS. 1 and 2 but showing a laminate having a metal foil surface sheet.

In the drawings, and considering the form of the invention shown in FIG. 1, the numeral 10 indicates generally a laminate of flexible sheet-like form having an overall thickness usually between about .005 inch and about .015 inch, although not limited to such dimensions, and particularly adapted to have silk screen or similar printing applied to the surface sheet thereof. The laminate also includes a pressure sensitive adhesive backing.

More specifically, the laminate 10 includes a surface sheet 12 of clear or pigmented plastic material, for example, having a thickness of between about .001 inch and about .005 inch and of a type compatible with having silk screen or similar printing 14 applied to the upper surface thereof by conventional methods. A typical clear plastic material which can be utilized is that manufactured under the trade name "Mylar" by E. I. du Pont de Nemours Company, this being a polyester material. A suitable pigmented plastic material is polyvinyl chloride applied as a plastisol or an organisol and pigmented in known fashion to any desired color.

Secured to the underside of the surface layer 12 is a layer of pressure sensitive adhesive 16, this usually being a rubber and resin combination and applied in a thickness, for example, of between about .0005 inch and about .0015 inch.

Secured to the underside of the adhesive layer 16 is a layer 18 of a release coat incompatible with the adhesive layer 16 and typically comprising a polymerized silicone and up to a thickness, for example, of .0005 inch.

Secured to the underside of the release coat 18 is a layer 20 of paper selected from the class including kraft and sulphite papers, and having a thickness, for example, of between about .002 inch and about .005 inch. Paper is used for this purpose because it has normally been so used and is recognized by the customer as the portion of the laminate to be peeled off to expose the pressure sensitive adhesive. Additionally, the paper has a stiffness and a thickness which allows the customer to readily get his fingernail or the like behind it to initiate the peeling off operation.

Secured to the underside of the paper 20 is a layer 22 of adhesive, usually of a thickness less than about .001 inch which serves to secure to the underside of the paper 20 a layer 24 of metal foil, and preferably aluminum, and having a thickness normally less than about .0005 inch, for example, in one embodiment a thickness of .00035 inch. The thickness of the metal core is, accordingly, less than about one-fourth, and usually less than about one-tenth of the thickness of the paper. The particular adhesive utilized in the layer 22 is a latex-casine adhesive, although good results have likewise been obtained by a wax base adhesive rendered flowable and sticky by the application of heat.

It will be understood that in the manufacture of the laminate as described that it is the usual practice to start with the paper 20 as a relatively wide continuous web which is moved through an elongated path. During movement in this path the release coat 18 and the adhesive layer 16 are progressively applied, the coating and layer are dried and the surface layer 12 is applied. The adhesive layer 22 and the metal foil layer 24 are also progressively applied to the paper 20 during its movement over the elongated path either before or after or even substantially or partially concurrent with the application of the coating and layers to the other surface of the paper.

A manufacturer of the laminate 10 may supply the laminate to the customer with the customer's requirements in printing 14 on the laminate. Or, more usually, the laminate 10 can be sold without the printing 14, and with the customer printing on the outer surface of surfacing layer 12 the desired printing 14 by silk screen or other comparable process. In either event, the metal foil layer 24 holds the laminate 10 during a printing operation in a patricularly flat, warp and wave-free manner and with a definite deadening effect so that high grade uniform printing operations can be performed. It can be said that once the laminate is flattened, it stays flat. Additionally, the metal foil layer 24 prevents the entrance of moisture into the paper layer 20 so that there is very little expansion or contraction of the paper layer 20 and the laminate is free of curling both before and after printing, and with the laminate staying flat until it is ready to be used.

In the use of the laminate 10 of FIG. 1 the same practices are followed as in any paper-backed pressure sensitive adhesive laminate. Specifically, the paper layer 20 with the release coat layer 18 adhering thereto is stripped from the pressure sensitive adhesive layer 16 so that the surfacing layer 12 can then be applied to any object by means of the pressure sensitive adhesive layer 16 in the usual well known manner to provide beautiful name plates, instructions, or other markings to any desired product.

The embodiment of the invention shown in FIG. 2 is like that illustrated in FIG. 1 except that in this form of the invention the surfacing layer 12a when made of clear plastic has applied to its undersurface a metallized layer 26 of aluminum, silver, gold, or the like, this layer 26 being typically applied with known vacuum or arc deposition techniques, and with the layer being relatively thin, usually less than .0005 inch. Like numerals have been applied to FIG. 2 to indicate similar parts to those shown in FIG. 1, except the suffix "a" has been added to each numeral.

The form of the invention shown in FIG. 3 is generally similar to those illustrated in FIGS. 1 and 2, and like parts have been indicated by the same numerals except that the suffix "b" has been added. Specifically, in FIG. 3, printing 14b is applied to the upper surface of a flexible surface sheet 12b, this sheet taking the form of metal foil, usually aluminum, and having a thickness between about .001 inch and about .003 inch, for example. The remainder of the laminate of FIG. 3 is substantially as described in FIG. 1, and the description will not be repeated.

While in accord with the patent statutes, at least one specific embodiment of the invention has been described in detail, it is to be particularly understood that the invention is not to be limited thereto or thereby, but that its scope is defined in the appended claims.

What is claimed is:

1. A substantially curl-free laminate for use as an adhesive-backed material and comprising a flexible surface sheet having a thickness of between about .001″ and about .005″, printing on the upper surface of said sheet, a layer of rubber and resin pressure sensitive adhesive having a thickness between about .0005″ and about .0015″ applied to the underside of the surface sheet, a layer of polymerized silicone release material incompatible with the adhesive layer and having a thickness of up to about .001″ applied to the underside of the adhesive layer, a layer of paper selected from the class including kraft and sulphite papers and a thickness of between about .002″ and about .005″ applied to the underside of the release material, a layer of adhesive of less than about .001″ in thickness applied to the underside of the paper, and a layer of metal foil having a thickness of less than about .0005″ applied to the underside of the last-named layer of adhesive to prevent the passage of moisture to the paper and increase the deadening effect of the laminate.

2. A substantially curl-free laminate for use as an adhesive-backed material and comprising a flexible surface sheet, a layer of pressure sensitive adhesive applied to the underside of the surface sheet, a layer of release material incompatible wtih the adhesive layer applied to the underside of the adhesive layer, a layer of paper applied to the underside of the release material, a layer of adhesive applied to the underside of the paper, and a layer of metal foil having a thickness of less than about one-tenth of the thickness of the paper applied to the underside of the last-named layer of adhesive to prevent the passage of moisture to the paper and increase the deadening effect of the laminate.

3. In a laminate having a surface material compatible to receive silk-screen printing on the outer surface and a pressure sensitive adhesive layer on the inner surface the combination of a layer of release material, incompatible with the adhesive layer, applied to the underside of the adhesive layer, a layer of paper between about .002″ and about .005″ thick applied to the underside of the release material, a layer of adhesive applied to the underside of the paper, a layer of metal foil applied to the underside of the last-named layer of adhesive, said foil being less than about one-fourth the thickness of the paper, said layer of foil preventing the passage of moisture to the paper of thereby prevent curling of the paper before the paper is removed, and said layer of metal foil greatly increasing the deadening properties of the laminate so that it will lay flat during printing.

References Cited by the Examiner

UNITED STATES PATENTS

| | | |
|---|---|---|
| 1,538,277 | 5/25 | Dula. |
| 2,157,183 | 5/39 | Mullen. |
| 2,209,210 | 7/40 | Scholl. |
| 2,588,367 | 3/52 | Dennett. |
| 2,654,684 | 10/53 | Heikin _____ 161—406 |
| 2,778,760 | 1/57 | Hurst _____ 161—250 |
| 2,804,416 | 8/57 | Phillipsen. |
| 3,021,250 | 2/62 | La Voie _____ 154—53.5 |

FOREIGN PATENTS

| | | |
|---|---|---|
| 175,556 | 2/22 | Great Britain. |

ALEXANDER WYMAN, *Primary Examiner.*

EARL M. BERGERT, CARL F. KRAFFT, *Examiners.*